GEL FILTRATION OF HAMSTER PLATELETS ON SEPHAROSE 2B.

RE-RUN OF PREVIOUSLY GEL FILTERED PLATELETS ON SEPHAROSE 2B

United States Patent Office 3,706,661
Patented Dec. 19, 1972

3,706,661
METHOD FOR THE SEPARATION OF CELLS FROM SOLUTES ACCOMPANYING SAID CELLS
Oddvar Tangen, Stigbergsvagen 8 C, Uppsala, Sweden; Herbert J. Berman, Boston, Mass. (142 Coolidge St., Brookline, Mass. 02146); and Peter Marfey, 9 Tudor Road, Albany, N.Y. 12203
Filed Oct. 5, 1970, Ser. No. 78,143
Int. Cl. B01d 15/08
U.S. Cl. 210—24                    13 Claims

ABSTRACT OF THE DISCLOSURE

A gel filtration method is applied to separate cells from the solutes present in their surrounding medium. The separation is accomplished by passing the cells through a column packed with a gel which retains all undesired components, and at the same time allows the cells to pass through the gel bed more rapidly. For clinical or other purposes the procedure can be performed under sterile conditions.

---

Figure 1:
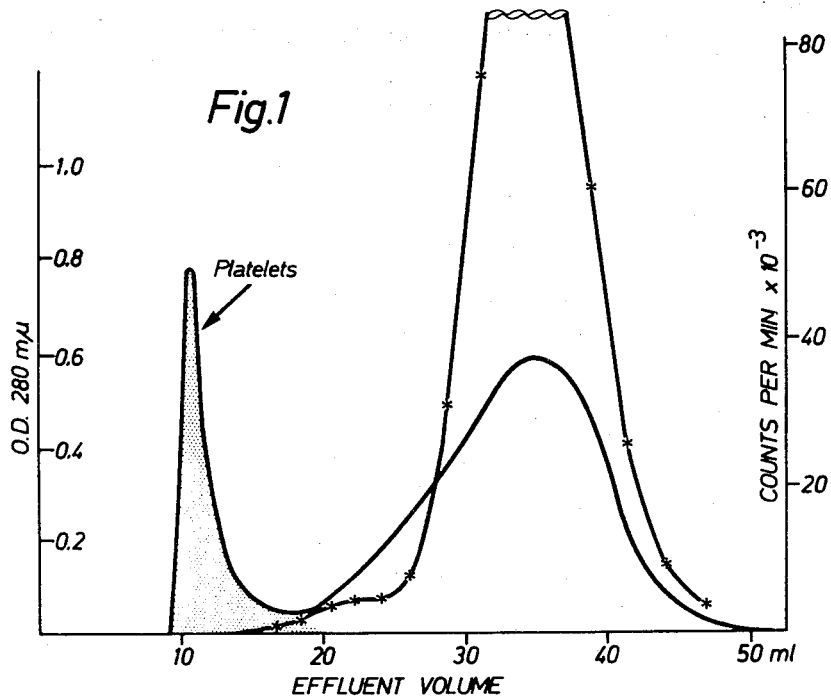

The present invention is concerned with a method for the separation of cells from solutes accompanying said cells by gel filtration. By "cells" in this text and in the claims we means cells in the widest biological sense, i.e. cytoplasm surrounded by a cell membrane or a cell wall. The absence and presence of nuclei is of no significance for the present method. For example, the formed elements of blood such as platelets and erythrocytes should also be regarded as cells in this context.

At present, the separation of cells in liquid suspension from their suspending medium is usually carried out while using different centrifugation techniques. These techniques have generally this in common that the cells are separated from the suspending medium by centrifugation and then resuspended in a new medium, said centrifugation and resuspension being repeated a number of times. A disadvantage with that technique is that the cells are subjected to forces of centrifugation which may result in mechanical damages. The centrifugation techniques comprise many steps, some of which must be left to the operators' own judgement, with the result that standardized conditions are difficult to achieve in the washing operations. In addition large and expensive equipment is usually needed for carrying out the separation.

The object of the present invention is to provide a method for the separation of cells that will overcome the disadvantages above referred to.

To this effect the present method uses a separating medium for the gel filtration process grains of a macroporous inert gel capable of absorbing the solutes accompanying the cells while permitting the cells to pass unretarded by the grains.

By the term "inert" in the present text and in the claims, we mean that the gel grains should not exert adsorption forces to retard the flow or passage of the cells through a body thereof such as a column.

The macroporous gel consists of a three-dimensional macromolecular network, the interstices of the network containing a liquid movable phase. It can be prepared in the form of beads or granules (gel particles), said beads or granules being capable of swelling when in contact with aqueous media while absorbing liquid. Concerning the theory of gel filtration, reference is made to U.S. Pat. No. 3,002,823.

What determines the accessability of a substance to the liquid phase inside the gel grains is the pore size of the macromolecular network, molecules of sizes smaller than the pores being capable of penetrating into the pores and molecules of sizes bigger than the pores being excluded by the gel grains. A separation is thus obtained between the different types of molecules. If a suspension of cells is passed through a column packed with gel grains of the type referred to the solutes surrounding the cells will enter into the pores of the gel whereby their passage through the column is slowed down in relation to the cells. The latter present too large sizes to be able to pass into the pores. Their passage will thus be concentrated to the spaces between the gel grains with the result that they will pass the column of gel grains more rapidly than the solutes.

The molecular sizes of the solutes to be separated from the cells determines the selection of gel grains to be used as a separating medium. Thus, when high molecular weight substances or particulate matter (fragments of cells, organells) are to be separated from cells a gel should be chosen which has pores of sufficient sizes to cause a penetration and consequently a retardation of the undesired substances or material, while excluding the cells. If relatively low molecular weight substances are to be separated from cells surrounded therewith a gel should be chosen the pores of which are of relatively small sizes.

According to the invention, the macroporous gel can present minor amounts of ionizable groups of the same charge as the net charge of the cells to be separated.

A condition for the separation process is that the macroporous gel is inert. The term "inert" does not exclude that the gel may present charges. However, these charges must not be of a type that can cause adsorbtion of cells to the gel whereby the movement of the cells outside the gel grains would be retarded. If the cells are negatively charged it may be advantageous if the substance of the gel grains contains minor amounts of cationizable groups whereby any risk of adsorbtion is removed.

When the method is used for certain application (clinical, bacteriological, etc.) the gel should be sterile and used under sterile conditions. In experiments it has been shown that gamma ray irradiation effectively sterilizes the agarose gel without adversely effecting its properties.

According to the invention, any separating medium consisting of macroporous gel grains can be used provided that they present suitable pore sizes. In the experiments described in the following, we have used a separating medium consisting of agarose grains (Sepharose®). It is, however, also possible to use grains of polyacrylamide gel. Examples of other suitable materials are modified cellulose, hydrophilic polymethacrylates such as polyethyleneglycolmethacrylate.

POSSIBLE APPLICATIONS OF THE TECHNIQUE

The method according to this invention may be used for numerous practical applications:

(1) Washing of erythrocytes prior to transfusion to get rid of undesired contaminants (free hemoglobin, adenine, etc.).
(2) Before storage as a means of replacing the plasma with the solution in which the cells are to be stored in frozen or unfrozen state. This procedure can be combined with large scale fractionation of the plasma.
(3) Washing of thawed erythrocytes after preservation by freezing to remove the free hemoglobin and additives as glycerol used in the procedure.
(4) As a means of removing the hepatitis virus from the erythrocytes.
(5) As a means of producing standardized washed red cells for antigen-antibody reactions (analytical) and for some types of blood grouping.
(6) Preservation of platelets by combination of this and other techniques.
(7) As a standard washing procedure for leucocytes.

Other probable applications are those exchanging suspension media of cells in tissue culture, bacteria, cancer cells, etc.

EXAMPLES

The following examples are illustrative of preferred embodiments of the present invention. It should be understood that these examples are not intended to limit the invention and that obvious changes may be made by those skilled in the art without changing the essential characteristics and the basic concept of the invention.

Gel filtration was performed using Sephadex Laboratory columns $K^{15}/30$ (1.5 cm. i.d. x 30 cm.) and Sepharose 2B Lots No. 3516 and 8761 (Pharmacia Fine Chemicals, Inc.). By means of a Uviscan III dual beam, UV flow monitor (Buchler) connected to a Bausch & Lomb VOM-6 recorder, a record of the optical density at 280 m$\mu$ was obtained of the eluate as it left the columns. The eluate was collected in siliconized tubes in a Warner Chilcott fraction collector. The flow rate in the majority of filtrations was in the range of 15 to 25 ml./hour, or 8.5–14 ml./cm.$^2$/hour, the cross-sectional area of the columns being 1.77 cm.$^2$. The total volume of the Sepharose bed ($V_t$) varied from 32–40 ml.

Void volume ($V_0$) determinations were performed using a 0.2% solution of Blue dextran (Pharmacia Fine Chemicals) in a .154 M NaCl according to the manufacturer's recommendations. $V_0$ was found to be 26.4±.8 expressed as percent of $V_t$±standard error of mean. The result is the mean of 4 experiments.

Example 1

Gel filtration of platelet free plasma (PFP).—The volume eluted from the column from the time of application of a sample of PFP to the column to the point where the first detectable component of the plasma emerged from the column ($V_{PFP}$) was measured by monitoring the eluate at 280 m$\mu$ with the Uviscan III. $V_{PFP}$ was found to be 55.5±2.0 expressed as percent of $V_t$±standard error of mean. This result is based on 4 experiments.

Example 2

Gel filtration of platelets.—The sample volume of platelet rich plasma (PRP) applied to the column varied from .5 ml. to 1.5 ml. The PRP was layered gently onto the gel under the elution fluid, and the run was started. The platelet peak always emerged well ahead of the plasma peak and could be detected both visually and by means of the Uviscan III. The eluting solution in these experiments was 0.154 M NaCl. The elution volume of platelets ($V_{pl}$) was determined according to the same principles as for determination of $V_0 \cdot V_{pl}$ was 24.7±0.5 expressed as percent of $V_t$±standard error of mean. This is the result of 5 separate experiments. It is seen that $V_{pl}$ is not significantly different from $V_0$. On the other hand $V_{pl}$ is much less than $V_{PFP}$. Consequently, the platelets are completely excluded from the gel particles and are eluted well in advance of the first detectable plasma constituents.

Example 3

Extent of separation of the platelets from plasma proteins not adsorbed to the platelet surface.—This was determined using $I^{131}$-labelled human serum albumin (Risa(R)—from Abbott). Lot No. X–991A with initial activity of 11.4 $\mu$C/mg. albumin was used. Small aliquots of the $I^{131}$-albumin with a total activity varying between 2 to 5 $\mu$C were added to samples of PRP and mixed. These mixtures were then submitted to gel filtration as described above, and fractions with volumes of approximately 1.8 ml. were collected. The elution pattern of the $I^{131}$-albumin was established by measuring the radioactivity of 1 ml. samples from each of the fractions of the eluate with a nuclear Chicago Well gamma counter, Model 1085/4216.

Figure 2:
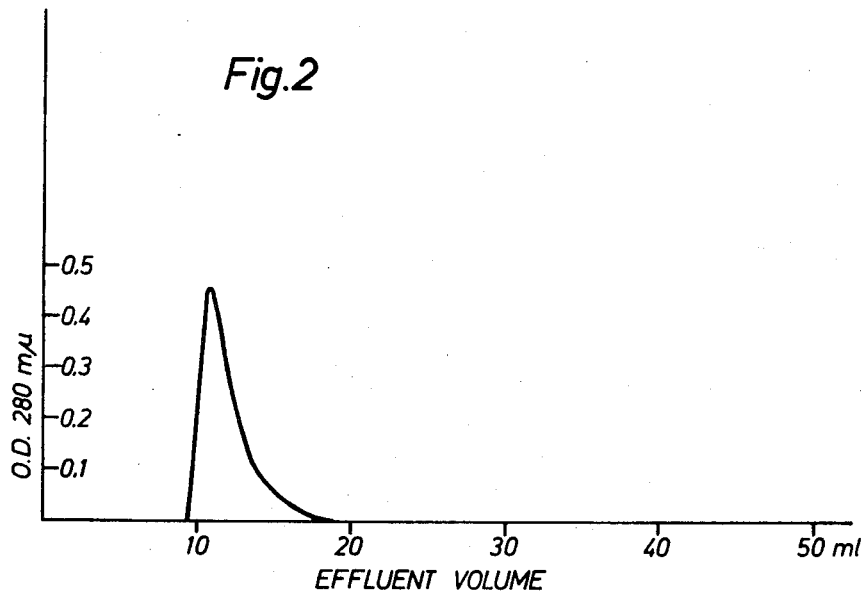

FIGS. 1 and 2 show the result of a typical experiment. The solid line represents the optical density of the eluate from the column. The first peak is the platelets and the second is the plasma constituents. A good separation of the platelets from the plasma is seen. The line with asterisks shows the radioactivity in the collected fractions. It is seen that the $I^{131}$-albumin is completely separated from the platelets.

Example 4

Repeated gel filtration of platelets.—A 1 ml. sample of previously gel filtered platelets was subjected once more to gel filtration according to the technique described above. The result of a typical experiment is shown in FIG. 2. Only one peak containing the platelets is seen. No other material is detected.

COMMENTS TO EXAMPLES 1 THROUGH 4

The experiments described were designed to demonstrate the separation of one specific type of cells (platelets) from a complex medium (plasma). All these experiments demonstrate that the separation is effectively obtained. Furthermore, the yield of platelets was found to be quantitative. A large number of experiments, which are not reported here, show the gel filtered platelets to be less changed, morphologically and physiologically, than platelets washed by the conventional centrifugation and resuspension technique.

Example 5

Gel filtration of erythrocytes.—The gel filtration technique used was analogous to the one described above. Experiments were performed on three agarose gels, Sepharose 2B, 4B and 6B. The erythrocytes were in all cases eluted in the void volume. In addition, thawed erythrocytes in hypertonic saline were subjected to gel filtration. In one experiment, 33 ml. of thawed erythrocytes in hypertonic saline were applied to a column of Sepharose 4B (size ~100 ml.). The yield was 85% erythrocytes and the concentration of free hemoglobin was low, well within acceptable range, and intracellular $K^+$ was normal. In another experiment, fresh erythrocytes were shown to be completely separated from added free hemoglobin.

Example 6

Gel filtration of erythrocytes on a macroporous polyacrylamide gel.—The polyacrylamide gel (Pharmacia Fine Chemicals) used had a porosity of 2,000–3,000 angstrom. It was in a bead polymerized form with the size of beads ranging from 40 to 150 microns. The flow properties of this gel were such as to obtain a flow of 200 cm. per hour using beads of 100 microns in diameter and a bed height of 10 cm.

Blood was applied to a column packed with this gel and eluted according to the principles mentioned above. The erythrocytes were shown to be eluted in the void volume and thereby well separated from the plasma constituents. This type of gel would appear suitable for separating cells from substances having very high molecular weights and optionally from particular material.

What we claim is:

1. In a method for recovering cells from a liquid suspension thereof wherein said cells are accompanied by solutes, the improvement which comprises:
    (A) introducing said suspension into a column consisting of grains of a macroporous inert gel which is capable of absorbing said solutes;
    (B) introducing an eluent into said column to cause said suspension to pass through said column;
    (C) permitting the cells to pass unretarded through the column while said solutes are retarded by said grains relative to the cells to cause a separation between said cells and said solutes; and
    (D) recovering said cells as a suspension in said eluent.

2. A method as claimed in claim 1, wherein a gel is employed with an exclusion limit higher than the molecular weights of the compounds from which the cellular elements are to be separated.

3. A method as claimed in claim 1, wherein the macroporous gel presents a minor amount of ionizable groups of the same charge as the net charge of the cells to be separated.

4. A method as claimed in claim 3, wherein the elution step of the gel filtration process is carried out at a pH in the range of from 5 to 8.5.

5. A method as claimed in claim 1, wherein the inert gel has an exclusion limit for proteins with molecular weight of 50,000,000.

6. A method as claimed in claim 1, wherein the macroporous inert gel is used under sterile conditions.

7. A method as claimed in claim 1, wherein the macroporous inert gel comprises agarose.

8. A method as claimed in claim 1, wherein the macroporous gel comprises polyacrylamide.

9. A method as claimed in claim 1, wherein the cells are platelets.

10. A method as claimed in claim 1, wherein the cells are erythrocytes.

11. A method as claimed in claim 1, wherein platelets or erythrocytes are separated and purified from undesired contaminants such as free hemoglobin and blood preservation additives.

12. A method as claimed in claim 6, wherein formed elements of blood which have previously been preserved by freezing in the presence of preservation additives are recovered.

13. A method as claimed in claim 12, wherein the formed elements of blood are erythrocytes or platelets.

References Cited

UNITED STATES PATENTS

| | | | |
|---|---|---|---|
| 3,481,477 | 12/1969 | Farr | 23—258.5 X |
| 3,578,604 | 5/1971 | Uriel | 210—31 C X |
| 3,177,117 | 4/1965 | Saunders | 424—101 X |
| 2,822,315 | 2/1958 | Cohn | 424—101 |
| 3,350,174 | 10/1967 | Mattenheimer | 23—230 B |
| 3,462,361 | 8/1969 | Greenwalt et al. | 23—258.5 X |
| 3,492,396 | 1/1970 | Dalton et al. | 23—230 B |
| 3,502,545 | 3/1970 | Westman et al. | 210—31 C X |
| 3,527,712 | 9/1970 | Renn et al. | 210—31 C X |
| 3,640,813 | 2/1972 | Nerenberg | 210—31 C |

REUBEN FRIEDMAN, Primary Examiner

T. G. WYSE, Assistant Examiner

U.S. Cl. X.R.

210—31 C; 23—230 B